United States Patent
Kitanaka

(10) Patent No.: US 8,344,680 B2
(45) Date of Patent: Jan. 1, 2013

(54) CONTROL APPARATUS OF ALTERNATING-CURRENT MOTOR

(75) Inventor: Hidetoshi Kitanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 415 days.

(21) Appl. No.: 12/746,002

(22) PCT Filed: Oct. 23, 2008

(86) PCT No.: PCT/JP2008/069247
§ 371 (c)(1),
(2), (4) Date: Jun. 3, 2010

(87) PCT Pub. No.: WO2009/072359
PCT Pub. Date: Jun. 11, 2009

(65) Prior Publication Data
US 2010/0259207 A1 Oct. 14, 2010

(30) Foreign Application Priority Data
Dec. 4, 2007 (JP) ................................ 2007-313504

(51) Int. Cl.
*H02P 27/04* (2006.01)
*H02P 21/00* (2006.01)

(52) U.S. Cl. .............. 318/632; 318/400.01; 318/400.02; 318/432

(58) Field of Classification Search .................. 318/432, 318/434, 599, 629, 632, 437, 256, 280, 287, 318/293, 139, 430, 722, 727, 700, 800, 803, 318/806, 807, 808, 609, 610, 400.01, 400.02, 318/400.17
See application file for complete search history.

(56) References Cited

U.S. PATENT DOCUMENTS

| 4,764,712 A | 8/1988 | Blaschke et al. |
| 5,854,547 A | 12/1998 | Nakazawa |

(Continued)

FOREIGN PATENT DOCUMENTS

DE 196 36 784 A1 3/1997

(Continued)

OTHER PUBLICATIONS

Supplemental European Search Report dated Apr. 29, 2011, issued in the corresponding European Patent Application No. 08856052.9-1242.

(Continued)

*Primary Examiner* — Eduardo Colon Santana
(74) *Attorney, Agent, or Firm* — Buchanan Ingersoll & Rooney PC

(57) ABSTRACT

A control apparatus of an alternating-current motor includes an inverter which is connected to a direct-current source and outputs three-phase alternating currents to the alternating-current motor, a current detector which detects a current of the alternating-current motor, a voltage command/PWM signal generation unit which calculates an output voltage command of the inverter based on a signal from the current detector and generates a pulse width modulation signal to control a switching element arranged in the inverter based on the output voltage command, and a motor current imbalance compensation unit which generates a motor current imbalance compensation amount based on the current detected by the current detector. The pulse width modulation signal is directly or indirectly adjusted at the voltage command/PWM signal generation unit based on the motor current imbalance compensation amount in accordance with a driving state of the inverter.

18 Claims, 7 Drawing Sheets

U.S. PATENT DOCUMENTS

| | | | |
|---|---|---|---|
| 5,959,430 A | 9/1999 | Yuki et al. | |
| 6,426,602 B1 * | 7/2002 | McCann et al. | 318/432 |
| 6,437,997 B1 | 8/2002 | Inarida et al. | |
| 6,838,844 B2 * | 1/2005 | Shimizu et al. | 318/287 |
| 6,933,690 B2 * | 8/2005 | Yamamoto | 318/400.04 |
| 7,216,049 B2 * | 5/2007 | Zhang et al. | 702/107 |
| 7,543,679 B2 * | 6/2009 | Colosky | 180/444 |
| 8,138,712 B2 * | 3/2012 | Yamada | 318/807 |
| 2006/0049792 A1 | 3/2006 | Chen et al. | |
| 2006/0119478 A1 * | 6/2006 | Karam et al. | 340/538 |

FOREIGN PATENT DOCUMENTS

| | | | |
|---|---|---|---|
| EP | 1 345 321 A1 | | 9/2003 |
| JP | 05260792 A | * | 10/1993 |
| JP | 2004-104898 A | | 4/2004 |
| JP | 2006-14426 A | | 1/2006 |
| JP | 2006-81287 A | | 3/2006 |
| JP | 2006-340486 A | | 12/2006 |
| KR | 10-1998-080006 | | 11/1998 |
| RU | 2 193 814 C2 | | 11/2002 |
| RU | 2 209 502 C2 | | 7/2003 |
| WO | WO 01/20766 | | 3/2001 |

OTHER PUBLICATIONS

International Search Report (PCT/ISA/210) dated Jan. 6, 2009.
Written Opinion (PCT/ISA/237) dated Jan. 6, 2009.
Office Action dated Sep. 9, 2011, issued in the corresponding Korean Patent Application No. 10-2010-7012187.
Decision on Grant from Russian Patent Office issued in corresponding Russian Patent Application No. 2010127251/07(038807) dated Oct. 19, 2011, with an English translation thereof.

* cited by examiner

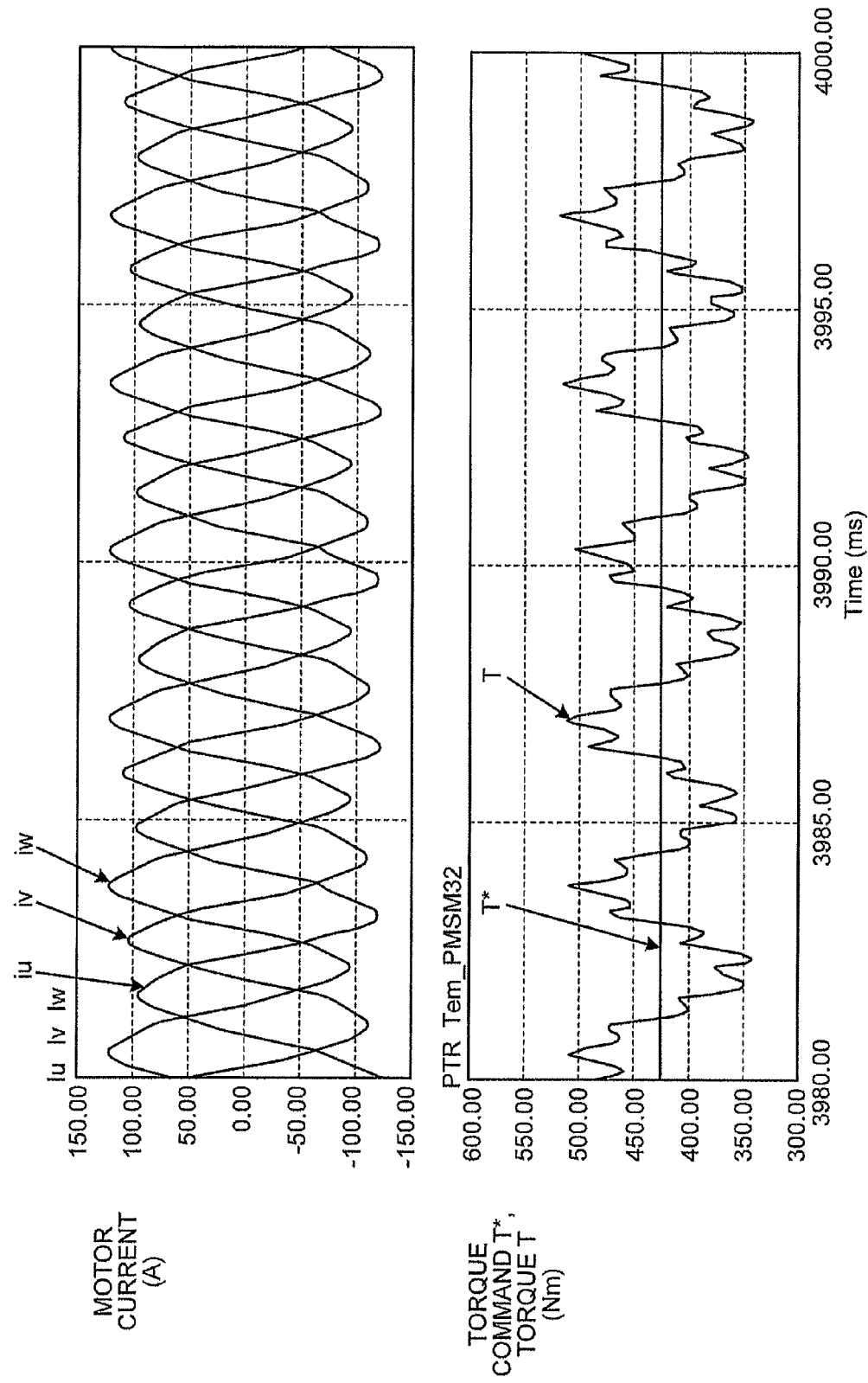

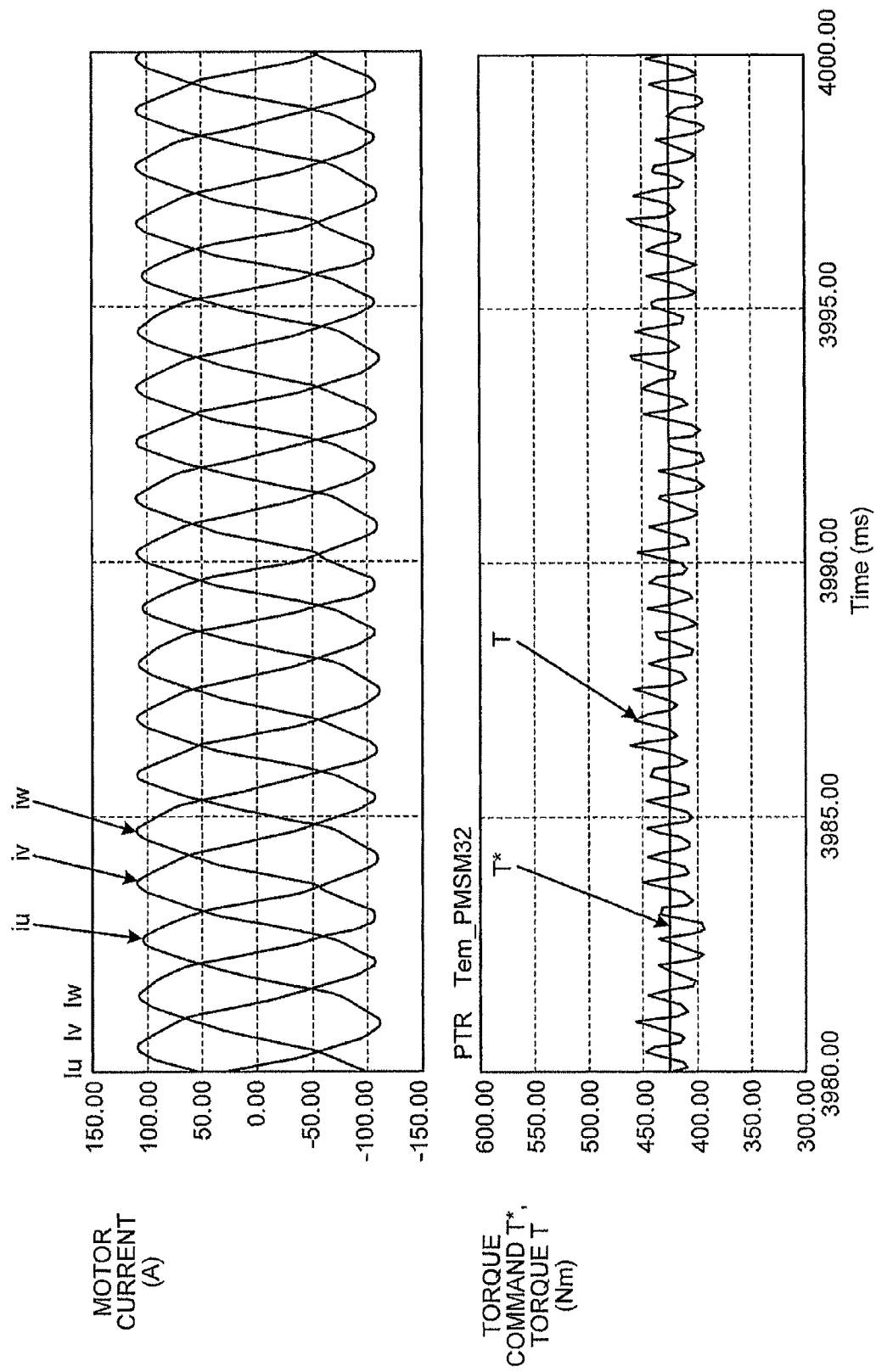

CONTROL APPARATUS OF ALTERNATING-CURRENT MOTOR

TECHNICAL FIELD

The invention relates to a control apparatus of an alternating-current motor for an electric vehicle driving, and particularly, relates to a control apparatus suitable for control of a permanent magnet synchronous motor.

BACKGROUND ART

In recent years, in application fields of alternating-current motors such as industrial equipment, home appliances and automobiles, a method to control driving of a permanent magnet synchronous motor with an inverter is becoming popular instead of a method to control driving of an induction motor in the related art with an inverter. A permanent magnet synchronous motor is known as a high efficiency motor compared to an induction motor because of the following features. Since magnetic flux is established by a permanent magnet incorporated in a rotor, current corresponding to excitation current is unnecessary. Since current does not flow through the rotor, secondary copper loss is not generated. Torque is effectively obtained by utilizing reluctance torque caused by a difference of magnetic resistance in the rotor in addition to the torque generated by the magnetic flux of the permanent magnet. Accordingly, applying the permanent magnet synchronous motor to an electric vehicle driving system has been studied in recent years.

A general control method of a permanent magnet synchronous motor is to perform current control by a current control system. A current detection value from a current detector disposed at an output side of an inverter is divided into a d-axis component (i.e., a magnetic flux current component) on a rotation coordinate system rotating in synchronization with a rotation phase of a rotor of a motor and a q-axis component (i.e., a torque current component) being perpendicular thereto. Largeness of voltage applied to the motor is adjusted so that d/q-axes current is matched to d/q-axes current command calculated from a torque command, while dividing.

In the case that a permanent magnet synchronous motor (hereinafter, called a motor) is considered to be applied to a driving system of an electric vehicle, a control apparatus of an alternating-current motor is required to be downsized and lightened since equipment is necessary to be mounted to a limited space under vehicle floor. In general, direct-current on the order of 1500 V to 3000 V is inputted to an inverter incorporated in the control apparatus of an alternating-current motor for an electric vehicle. Therefore, a high voltage resistant switching element being resistant to the order of 3300 V to 6500 V is used. Here, both of switching loss and conduction loss are large with such a high voltage resistant switching element. To avoid requiring an excessive switching element cooling apparatus including a cooler and a cooling fan, the acceptable switching frequency is on the order of 1000 Hz at highest. This is a low value on the order of one tenth to one twentieth compared to the frequency for home appliances, industrial inverters and electric vehicles, for example.

It is important for reducing size and weight of the control apparatus of an alternating-current motor to reduce loss generated by the incorporated switching element in order to reduce size and weight of the cooling apparatus thereof. Accordingly, it is necessary to suppress motor current as low as possible by setting the switching frequency as low as possible and applying inverter input voltage to the motor as much as possible.

Meanwhile, the maximum value output frequency of the inverter (i.e., the output frequency of the inverter at the designed maximum speed of an electric vehicle) for an application of an electric vehicle is approximately 400 Hz. For example, in the case that the output frequency of the inverter is at the vicinity of 400 Hz which is the maximum value, the number of pulses included in a half cycle of the inverter output voltage is approximately 1.875 which is obtained from the switching frequency divided by the output frequency of the inverter resulting in being extremely small, provided that the switching frequency of the inverter is approximately 1000 Hz which is the maximum.

When the motor is driven in such a state, the pulse number and the pulse position included respectively in a positive half cycle and a negative half cycle of the inverter output voltage are imbalanced. Then, symmetry between positive and negative of the voltage applied to the motor (i.e., line voltage) is lost, so that noise and vibration is caused due to generation of electric vibration and torque pulsation with the motor.

Accordingly, a so-called synchronous pulse mode such as a synchronous five-pulse mode, a synchronous three-pulse mode and the like to determine switching timing in synchronization with the inverter output voltage is used in an area where the output frequency of the inverter is relatively high. Further, in the case that the maximum voltage is applied to the motor, the motor is operated using a one-pulse mode in which the inverter output voltage is a rectangular wave. In the synchronous mode and the one-pulse mode, the pulse number and the pulse position included in a half cycle of the inverter output voltage is constant and is not varied with time. Therefore, the pulse number and the pulse position are the same between the positive half cycle and the negative half cycle of the inverter output voltage. Accordingly, since the symmetry between positive and negative of the voltage applied to the motor is maintained, electric vibration and torque pulsation are not generated in the motor.

As described above, in order to stably drive an inverter for an electric vehicle, an asynchronous pulse mode is selected, in which a switching frequency is not in synchronization with an output frequency of the inverter (for example, at 1000 Hz constant), in a driving area where the output frequency of the inverter is relatively low. A one-pulse mode, in which the inverter output voltage is a rectangular wave or a synchronous pulse mode, is selected in a driving area where the output frequency of the inverter is relatively high. That is, the motor is driven while the pulse mode is switched in accordance with the output frequency of the inverter.

In the synchronous pulse mode or the one-pulse mode, the number of pulses included in a half cycle of the inverter output voltage is small. Accordingly, in order to ensure control stability, a configuration is adopted in which decreasing current control response of the above-mentioned current control system, stopping calculation of the current control system, and switching to control of adjusting only phases of voltage applied to the motor are possible.

Patent Document 1: Japanese Patent Application Laid-open 2006-081287

DISCLOSURE OF INVENTION

Problem to be Solved by the Invention

Incidentally, when controlling to drive a permanent magnet synchronous motor, it is necessary to appropriately determine an inverter output voltage command in accordance with a rotor position of the motor. In general, the phase of the inverter output voltage command is determined based on the rotor position signal of the motor obtained by a position detector disposed at an axial end of the motor. Due to an error from a true value contained in the output of the position detector, an error is also generated with the inverter output voltage command which is determined based thereon. In addition, due to unevenness of on-voltage-drop among a plurality of switching elements forming the inverter, correlation variation of the impedance of the motor and the like, there may be a case that three-phase symmetry of the voltage of the motor is lost and three-phase imbalance of the motor current is generated.

As described above, particularly in the area of the synchronous pulse mode and the one-pulse mode, decreasing current control response of the d/q-axes current, stopping calculation of the current control system, or switching to control of adjusting only phases of voltage applied to the motor is performed. In this case, the suppressing effect of the current control system against the three-phase imbalance of the motor current is decreased or invalidated. Accordingly, there may be a case that the motor is driven while the three-phase imbalance of the motor current is maintained. In such a state, torque pulsation is generated in the motor, so that noise and ride quality are worsened.

As described above, in the permanent magnet synchronous motor, a permanent magnet is incorporated in the rotor. When the three-phase imbalance is generated in the motor current, there may be a case that magnetic flux in the permanent magnet is largely fluctuated and temperature rise is caused due to flowing of eddy current to the permanent magnet. When the temperature rises, the magnetic flux of the permanent magnet is decreased. Further, when the temperature exceeds a limit temperature, irreversible demagnetization occurs and the magnetic force of the permanent magnet is kept lost even after the temperature is lowered. That is, the permanent magnet synchronous motor is damaged and not to be able to generate torque.

To address problems described above, the invention provides a control apparatus of an alternating-current motor, which performs driving in a synchronous pulse mode and in a one-pulse mode, capable of suppressing three-phase imbalance of motor current caused by an error from a true value contained in output of a position detector, an error of an inverter output voltage command, unevenness of on-voltage-drop among switching elements, or correlation variation of motor impedance, and capable of preventing torque pulsation and damage of the motor.

Means for Solving Problem

A control apparatus of an alternating-current motor according to an aspect of the invention includes a three-phase inverter which is connected to a direct-current source and outputs three-phase alternating currents of arbitrary frequency and arbitrary voltage to the alternating-current motor; a current detector which detects a current of the alternating-current motor; a voltage command/PWM signal generation unit which calculates an output voltage command of the inverter based on a signal from the current detector, and generates a pulse width modulation signal to control a switching element, which is arranged in the inverter, based on the output voltage command; and a motor current imbalance compensation unit which generates motor current imbalance compensation amounts of the corresponding phases based on the currents of at least any two of the phases among the currents of the alternating-current motor and sets a motor current imbalance compensation amount of the remaining one phase to be zero, wherein the voltage command/PWM signal generation unit directly or indirectly adjusts the pulse width modulation signal of the two phases based on the motor current imbalance compensation amount in accordance with a driving state of the inverter.

Effect of the Invention

The above-mentioned configuration provides a control apparatus of an alternating-current motor, which performs driving in a synchronous pulse mode and in a one-pulse mode, capable of suppressing three-phase imbalance of motor current caused by an error from a true value contained in output of a position detector, an error of an inverter output voltage command, unevenness of on-voltage-drop among switching elements, or correlation variation of motor impedance, and capable of preventing torque pulsation and damage of the motor.

BRIEF DESCRIPTION OF DRAWINGS

FIG. 4-1 is a view which illustrates an example of motor current waveforms according to the first embodiment of the invention in a case that motor current imbalance compensation is not performed;

FIG. 4-2 is a view which illustrates an example of motor current waveforms according to the first embodiment of the invention in a case that the motor current imbalance compensation is performed;

| EXPLANATIONS OF LETTERS OR NUMERALS | |
|---|---|
| 1 | Capacitor |
| 2 | Inverter |
| 3, 4, 5 | Current detector |
| 6 | Motor |
| 7 | Resolver |
| 8 | Voltage detector |
| 10 | Current command generation unit |
| 11 | d-axis base current command generation unit |
| 14 | Adder |
| 15 | q-axis current command generation unit |
| 20 | d-axis current control unit |
| 21 | q-axis decoupling arithmetic unit |
| 22 | d-axis decoupling arithmetic unit |
| 23 | q-axis current control unit |
| 30 | Modulation factor arithmetic unit |
| 40 | Control phase angle arithmetic unit |

-continued

EXPLANATIONS OF LETTERS OR NUMERALS

| | |
|---|---|
| 50 | Voltage command/PWM signal generation unit |
| 53 | Multiplier |
| 54 | Adjustment gain table |
| 55 | Voltage command arithmetic unit |
| 57 | Asynchronous carrier signal generation unit |
| 58 | Synchronous three-pulse carrier generation unit |
| 59 | Switch |
| 60 | Pulse mode switch processing unit |
| 61-63 | Comparator |
| 64-66 | Inverting circuit |
| 67-69 | Adder |
| 70 | Inverter angular frequency arithmetic unit |
| 90 | Three-phase dq-axes coordinates conversion unit |
| 95 | Base phase angle arithmetic unit |
| 100A-100D | Motor current imbalance compensation unit |
| 101U-101W | Low-pass filter (LPF) |
| 102U-102W | Gain |
| 103U-103W | Proportional integral element |
| 104 | Subtractor |
| 105 | Adder |
| 106U-106W | Subtractor |
| 200 | Control apparatus of alternating-current motor |

BEST MODE(S) FOR CARRYING OUT THE INVENTION

In the following, embodiments of a control apparatus of an alternating-current motor according to the invention will be described in detail with reference to the drawings. Incidentally, the invention is not limited to the following embodiments.

First Embodiment

Figure 1:
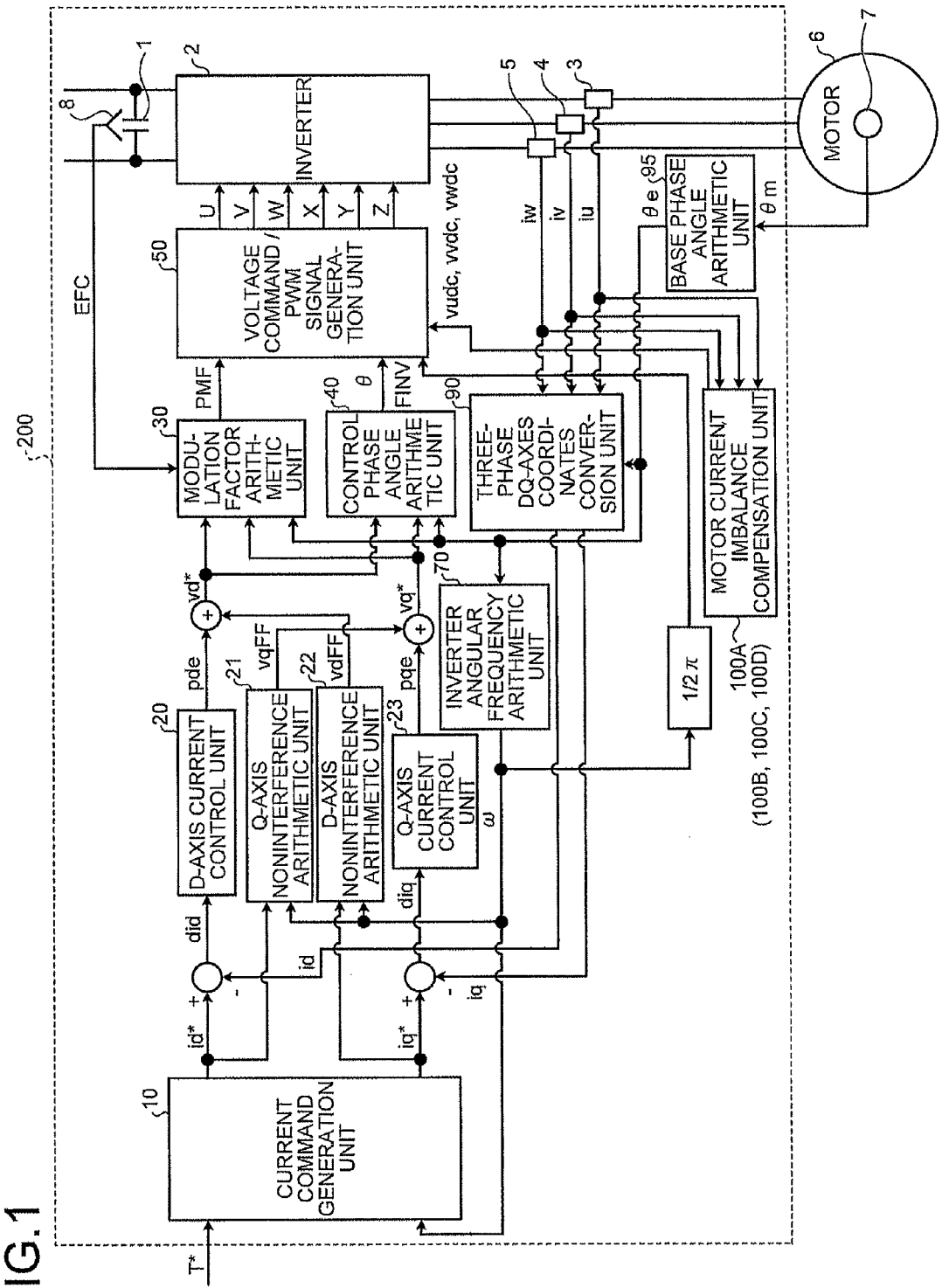
FIG. 1 is a view which illustrates a structural example of a control apparatus of an alternating-current motor according to a first embodiment of the invention.

FIG. 1 is a view illustrating a structural example of a control apparatus of an alternating-current motor according to a first embodiment of the invention. As illustrated in FIG. 1, a main circuit is configured with a capacitor 1 being a direct-current source, an inverter 2 converting direct-current voltage of the capacitor 1 into alternating-current voltage of an arbitrary frequency, and a permanent magnet synchronous motor (hereinafter, simply called a motor) 6. The circuit is provided with a voltage detector 8 to detect voltage of the capacitor 1, and current detectors 3, 4, 5 to respectively detect motor currents iu, iv, iw being output line currents of the inverter 2. The motor 6 is provided with a resolver 7 being a position detector to detect a rotor mechanical angle θm. The detection signals are inputted respectively to units which are described later.

Here, it is also possible that an encoder is used instead of the resolver 7. Further, it is also possible to adopt a method without a position sensor to obtain a position signal by calculating with the detected voltage, current and the like instead of the position signal obtained by the resolver 7. In this case, the resolver 7 becomes unnecessary. That is, obtaining a position signal is not limited to using the resolver 7. Moreover, regarding the current detectors 3, 4, 5, assuming that at least two phases are provided therewith, the current of the remaining phase can be obtained by calculating as the current sum of the three phases is to be zero. Accordingly, such a configuration may be adopted. Instead, it is also possible to obtain the output current of the inverter 2 by reproducing from the direct-current side current of the inverter 2.

The control apparatus 200 of an alternating-current motor is configured such that a torque command T* is inputted from an external control device (not illustrated) and is configured to control the inverter 2 so that a generating torque T of the motor 6 is to be matched to the torque command T*.

Gate signals U, V, W, X, Y, Z generated by a voltage command/PWM signal generation unit 50 which is described later is inputted to the inverter 2. A switching element mounted on the inverter 2 is PWM-controlled. A voltage type PWM inverter is suitable for the inverter 2, which is well-known and thus is not described in detail.

Next, the configuration of each unit of the control apparatus 200 of an alternating-current motor will be described. The control apparatus 200 of an alternating-current motor includes a base phase angle arithmetic unit 95 to calculate a base phase angle $\theta_e$ from a rotor mechanical angle $\theta_m$; a three-phase dq-axes coordinates conversion unit 90 to generate d-axis current id and q-axis current iq from three-phase currents iu, iv, iw detected respectively by the current detectors 3, 4, 5, and the base phase angle $\theta_e$; an inverter angular frequency arithmetic unit 70 to calculate an inverter output angular frequency ω from the base phase angle $\theta_e$; a current command generation unit 10 to generate a d-axis current command id* and a q-axis current command iq* from the externally inputted torque command T* and the inverter output angular frequency ω; a d-axis current control unit 20 to perform proportional integral control on the difference between the d-axis current command id* and d-axis current and to generate a d-axis current error pde; a q-axis current control unit 23 to perform proportional integral control on the difference between the q-axis current command iq* and q-axis current and to generate a q-axis current error pqe; a q-axis decoupling arithmetic unit 21 to calculate q-axis feedforward voltage vqFF from the d-axis current command id* and the inverter angular frequency ω; a d-axis decoupling arithmetic unit 22 to calculate d-axis feedforward voltage vdFF from the q-axis current command iq* and the inverter angular frequency ω; a modulation factor arithmetic unit 30 to calculate a modulation factor PMF from a d-axis voltage command vd* being the sum of the d-axis current error pde and the d-axis feedforward voltage vdFF, a q-axis voltage command vq* being the sum of the q-axis current error pqe and the q-axis feedforward voltage vqFF, the base phase angle $\theta_e$, and voltage EFC of the capacitor 1; a control phase angle arithmetic unit 40 to calculate a control phase angle θ from the d-axis voltage command vd* being the sum of the d-axis current error pde and the d-axis feedforward voltage vdFF, the q-axis voltage command vq* being the sum of the q-axis current error pqe and the q-axis feedforward voltage vqFF, and the base phase angle $\theta_e$; a voltage command/PWM signal generation unit 50 to generate gate signals U, V, W, X, Y, Z for the inverter 2 from the modulation factor PMF, the control phase angle θ, the output frequency of the inverter FINV, and motor current imbalance compensation amounts vudc, vvdc, vwdc; and a motor current imbalance compensation unit 100A (100B, 100C, 100D) to receive the three-phase currents iu, iv, iw and to generate motor current imbalance compensation amounts vudc, vvdc, vwdc. The motor current imbalance compensation units 100B, 100C, 100D respectively represent those of the second to fourth embodiments.

Next, the configuration of each of the above-mentioned control blocks will be described in detail. At the base phase angle arithmetic unit 95, the base phase angle $\theta_e$ being an electric angle is calculated from the rotor mechanical angle $\theta_m$ based on following equation (1).

$$\theta e = \theta m \cdot PP \tag{1}$$

Here, PP denotes the number of pole pairs of the motor 6.

At the three-phase dq-axes coordinates conversion unit 90, the d-axis current id and the q-axis current iq are generated from the three-phase currents iu, iv, iw and the base phase angle $\theta_e$ based on following equation (2).

[Formula 1]

$$\begin{pmatrix} iq \\ id \end{pmatrix} = \sqrt{\frac{2}{3}} \begin{pmatrix} \cos\theta e & \cos\left(\theta e - \frac{2}{3}\pi\right) & \cos\left(\theta e + \frac{2}{3}\pi\right) \\ \sin\theta e & \sin\left(\theta e - \frac{2}{3}\pi\right) & \sin\left(\theta e + \frac{2}{3}\pi\right) \end{pmatrix} \cdot \begin{pmatrix} iu \\ iv \\ iw \end{pmatrix} \quad (2)$$

At the inverter angular frequency arithmetic unit 70, the inverter output angular frequency ω is calculated by differentiating the base phase angle $\theta_e$ based on the following equation (3).

$$\omega = d(\theta e)/dt \quad (3)$$

In addition, the output frequency of the inverter FINV is calculated by dividing the inverter output angular frequency ω by 2π.

Next, the configuration of the current command generation unit 10 will be described. At the current command generation unit 10, the d-axis current command id* and the q-axis current command iq* are generated from the externally inputted torque command T* and the inverter output angular frequency ω. The generation method may be the maximum torque/current control that generates the maximum torque at certain current, or the maximum efficiency control that maintains the motor efficiency at maximum. Such optimal control methods perform adjustment such that the actual current of the motor 6 is matched respectively to the current command for optimal torque (i.e., the q-axis current command iq*) and the current command for optimal magnetic flux (i.e., the d-axis current command id*) which are obtained using an arithmetic equation and previously stored in a table.

Next, the d-axis current control unit 20 and the q-axis current control unit 23 respectively generate the d-axis current error pde by performing proportional integral amplification on the difference between the d-axis current command id* and the d-axis current and the q-axis current error pqe by performing proportional integral amplification on the difference between the q-axis current command iq* and the q-axis current, based on following equations (4), (5).

Here, K1 and K3 denote proportional gains and K2 and K4 denote integral gains.

$$pqe = (K1 + K2/s) \cdot (iq^* - iq) \quad (4)$$

$$pde = (K3 + K4/s) \cdot (id^* - id) \quad (5)$$

As the reason is described above, in the case of driving especially in a synchronous pulse mode or one-pulse mode, the equations (4), (5) may not be used for the control. The outputs of pde, pqe may be fixed to the values just before stopping the calculation. Alternatively, the outputs may be gradually decreased to zero.

The d-axis decoupling arithmetic unit 22 and the q-axis decoupling arithmetic unit 21 respectively calculate the d-axis feedforward voltage vdFF and the q-axis feedforward voltage vqFF based on following equations (6), (7).

$$vdFF = (R1 + s \cdot Ld) \cdot id^* - \omega \cdot Lq \cdot iq^* \quad (6)$$

$$vqFF = (R1 + s \cdot Lq) \cdot iq^* + \omega \cdot (Ld \cdot id^* - \phi a) \quad (7)$$

Here, R1, Ld, Lq, φa and s respectively denote primary coil resistance (Ω) of the motor 6, d-axis inductance (H), q-axis inductance (H), permanent magnet flux (Wb) and a differential operator.

The modulation factor arithmetic unit 30 calculates, based on following equation (8), from the d-axis voltage command vd* being the sum of the d-axis current error pde and the d-axis feedforward voltage vdFF, the q-axis voltage command vq* being the sum of the q-axis current error pqe and the q-axis feedforward voltage vqFF, the base phase angle $\theta_e$, and the voltage EFC of the capacitor 1.

$$RMF = VM^*/VM\max \quad (8)$$

where:

$$VM\max = (\sqrt{6/\pi}) \cdot EFC \quad (9)$$

$$VM^* = \mathrm{sqrt}(vd^{*2} + vq^{*2}) \quad (10)$$

Here, the modulation factor PMF indicates a ratio of largeness of the inverter output voltage command vector VM* against the maximum voltage VMax (as defined by equation (9)) which can be outputted from the inverter. In the case that PMF=1.0, the largeness of the inverter output voltage command vector VM* is to be equal to the maximum voltage VMax which can be outputted from the inverter.

Further, as can be seen from equations (2) to (10), the modulation factor PMF is varied with the d-axis current command id* and the q-axis current command iq* which are generated by the current command generation unit 10.

The control phase angle arithmetic unit 40 calculates, based on following equation (11), the control phase angle θ from the d-axis voltage command vd* being the sum of the d-axis current error pde and the d-axis feedforward voltage vdFF, the q-axis voltage command vq* being the sum of the q-axis current error pqe and the q-axis voltage forward voltage vqFF, and the base phase angle $\theta_e$.

$$\theta = \theta e + \pi + THV \quad (11)$$

where:

$$THV = \tan^{-1}(vd^*/vq^*) \quad (12)$$

Figure 2:
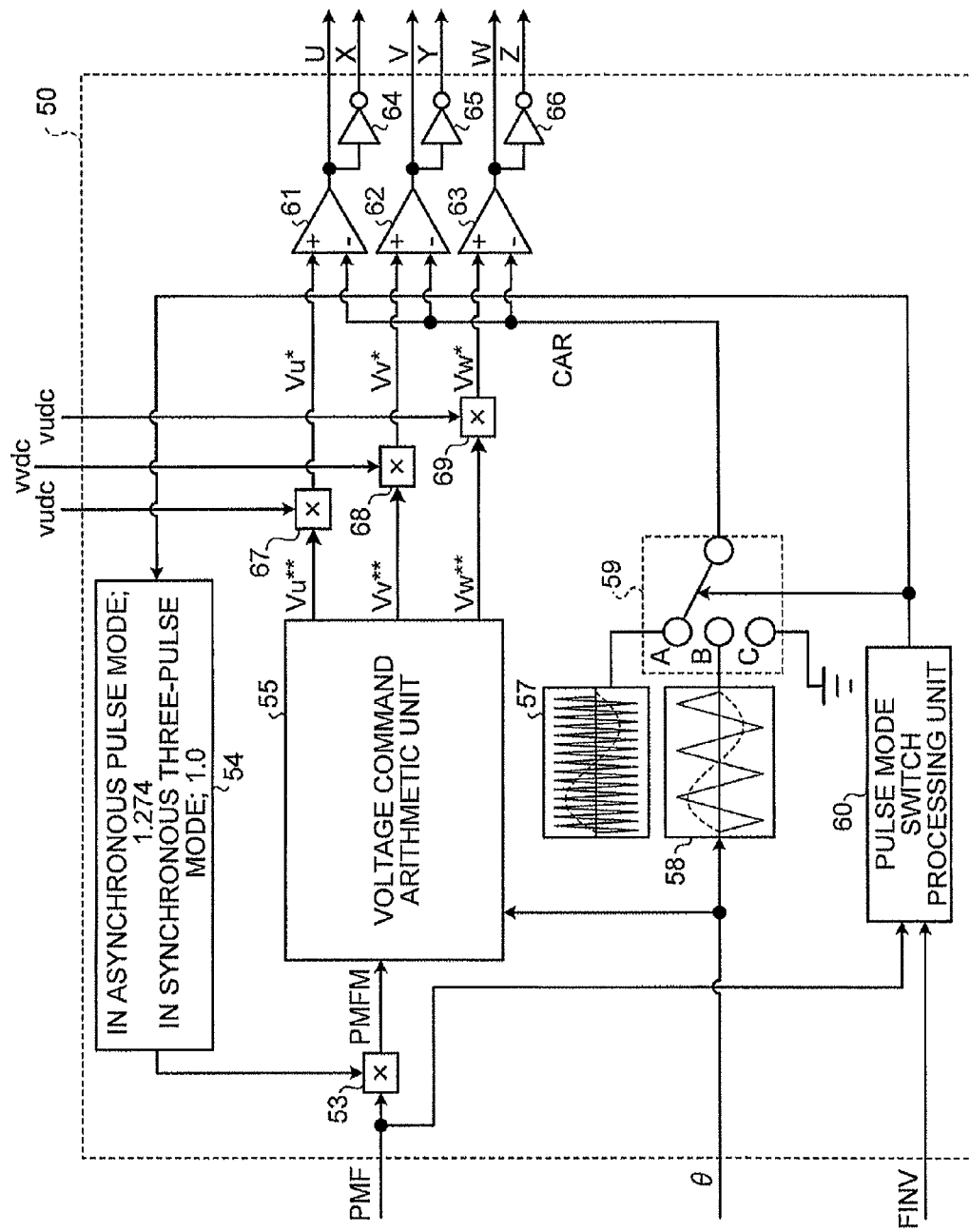
FIG. 2 is a view which illustrates a structural example of a voltage command/PWM signal generation unit according to the first embodiment of the invention.

Next, the configuration of the voltage command/PWM signal generation unit 50 will be described. FIG. 2 is a view illustrating a configuration example of the voltage command/PWM signal generation unit 50 according to the first embodiment of the invention. As illustrated in FIG. 2, a voltage command arithmetic unit 55 generates a U-phase base voltage command Vu, a V-phase base voltage command Vv and a W-phase base voltage command Vw**, which are three-phase voltage commands, from the modulation factor PMF and the control phase angle θ based on following equations (13) to (15).

$$Vu^{**} = PMFM \cdot \sin\theta \quad (13)$$

$$Vv^{**} = PMFM \cdot \sin(\theta - (2 \cdot \pi/3)) \quad (14)$$

$$Vw^{**} = PMFM \cdot \sin(\theta - (4 \cdot \pi/3)) \quad (15)$$

Next, adders 67 to 69 generate a U-phase voltage command Vu*, a V-phase voltage command Vv* and a W-phase voltage command Vw* by respectively adding the later-mentioned motor current imbalance compensation amounts vudc, vvdc, vwdc to the U-phase base voltage command Vu, the V-phase base voltage command Vv and the W-phase base voltage command Vw**.

Further, as described later, a carrier signal CAR to be compared to the above-mentioned voltage commands Vu*, Vv*, Vw* of the respective phases includes at least an asynchronous carrier signal and a synchronous signal. Further, the CAR is configured to be selectable in accordance with a pulse mode selected by a pulse mode switch processing unit 60 which is a pulse mode control unit. Here, the asynchronous carrier signal used in an asynchronous pulse mode is a carrier signal having a frequency (for example, 1000 Hz constant) which is determined asynchronous with the output frequency of the inverter FINV.

Further, the frequency of the synchronous carrier signal is synchronized as a function of the output frequency of the inverter FINV so that the number and position of pulses forming the inverter output voltage are to be equal between a positive side half cycle and a negative side half cycle of the inverter output voltage. In the example described of the embodiment, a synchronous three-pulse carrier signal is used as the synchronous carrier signal. However, a synchronous five-pulse carrier signal and the like may be adopted instead. Further, it is also possible to prepare a plurality of synchronous carrier signals and to perform switching as required.

The coefficient PMFM in equations (13) to (15) is a voltage command amplitude obtained through multiplying the modulation factor PMF by the output of an adjustment gain table 54 at a multifier 53. The adjustment gain table 54 is for correction against difference of relation of the inverter output voltage VM with the modulation factor PMF between the asynchronous pulse mode and the synchronous three-pulse mode. The general outline thereof will be described in the following.

The maximum voltage (i.e., the root-mean square value) which can be outputted by the inverter is 0.612·EFC in the asynchronous pulse mode, while being 0.7797·EFC in the synchronous three-pulse mode. That is, the inverter output voltage against the modulation factor PMF in the asynchronous pulse mode is to be 1/1.274 compared to that in the synchronous three-pulse mode. In order to cancel the difference, in the asynchronous pulse mode, the modulation factor PMF is multiplied by 1.274 and inputted to the above-mentioned voltage command arithmetic unit 55 as the voltage command amplitude PMFM. Strictly speaking, the relation of the inverter output voltage against the modulation factor PMF is nonlinear. The relation may be indicated by a table taking that into consideration.

Next, the U-phase voltage command Vu*, the V-phase voltage command Vv* and the W-phase voltage command Vw* are compared to the carrier signal CAL in largeness at comparators 61 to 63. Then, X, Y and Z are generated respectively via the gate signals U, V, W and inverting circuits 64 to 66. The carrier signal CAL is a signal selected by the pulse mode switch processing unit 60 with a switch 59 out of an asynchronous carrier signal A generated by a asynchronous carrier signal generation unit 57, a synchronous three-pulse signal B generated by a synchronous three-pulse carrier signal generation unit 58, and a zero value C to be selected in the one-pulse mode. The values of the asynchronous carrier signal A and the synchronous three-pulse carrier signal B respectively vary from −1 to 1 having zero as the center thereof.

The pulse mode switch processing unit 60 is operated to select the asynchronous pulse mode when the modulation factor PMF is smaller than 0.785, select the synchronous pulse mode when the modulation factor PMF is 0.785 or larger and smaller than 1.0, and select the one-pulse mode when the modulation factor is 1.0 or larger.

Figure 3:
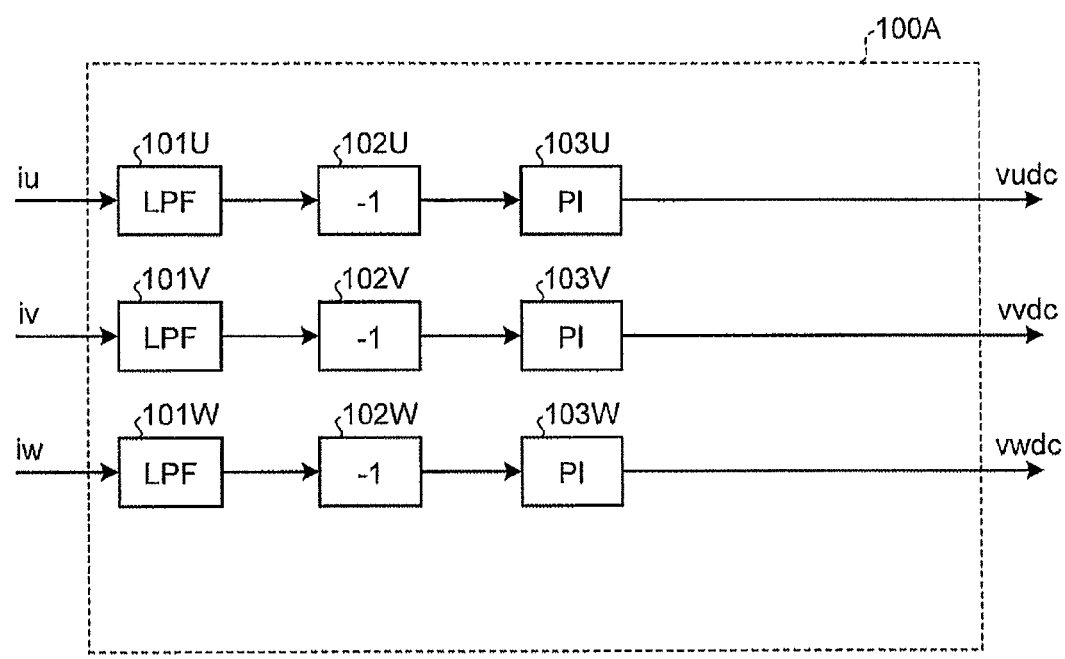
FIG. 3 is a view which illustrates a structural example of a motor current imbalance compensation unit according to the first embodiment of the invention.

Next, the configuration of the motor current imbalance compensation unit 100A according to the embodiment will be described in the following. FIG. 3 is a view illustrating a structural example of the motor current imbalance compensation unit 100A according to the first embodiment of the invention. As illustrated in FIG. 3, the three-phase currents iu, iv, iw detected respectively by the current detectors 3, 4, 5 are inputted to the motor current imbalance compensation unit 100A. Unnecessary frequency components contained in the three-phase currents iu, iv, iw are eliminated respectively by low-pass filters 101U to 101W (hereinafter, indicated as LPF). Then, after being inverted in polarity respectively by gains 102U to 102W, the obtained signals are inputted respectively to proportional integral elements 103U to 103W. The outputs of the proportional integral elements 103U to 103W are outputted as the motor current imbalance compensation amounts vudc, vvdc, vwdc of the respective phases.

With the above-mentioned configuration, it becomes possible to compensate the imbalance of the motor current caused by an error from a true value contained in the output of the resolver 7 being the position detector, an error contained in the inverter output voltage command, unevenness of on-voltage-drop among switching elements constituting the inverter 2, correlation variation of the impedance of the motor 6 and the like. Accordingly, it becomes possible to provide the control apparatus 200 of an alternating-current motor capable of preventing torque pulsation and damage of the motor 6.

Next, waveforms in the one-pulse mode when the first embodiment of the invention is applied will be described in the following. FIG. 4-1 is a view illustrating an example of motor current waveforms in the case that the motor current imbalance compensation is not performed. FIG. 4-2 is a view illustrating an example of motor current waveforms according to the first embodiment of the invention in the case that the motor current imbalance compensation is performed. As illustrated in FIG. 4-1, when the motor current imbalance compensation is not performed, both of the U-phase current iu and the V-phase current iv are offset to the negative side by the order of 10 A. Meanwhile, the W-phase current iw is offset to the positive side by the order of 10 A. Further, the torque T is pulsating at the same frequency with that of the motor current between 350 Nm and 500 Nm against the torque command T* of 425 Nm. As illustrated in FIG. 4-2, when the motor current imbalance compensation is performed, the pulsation of a motor current frequency component of the torque T is excellently suppressed while the current imbalance of respective phases is suppressed.

Second Embodiment

Figure 5:
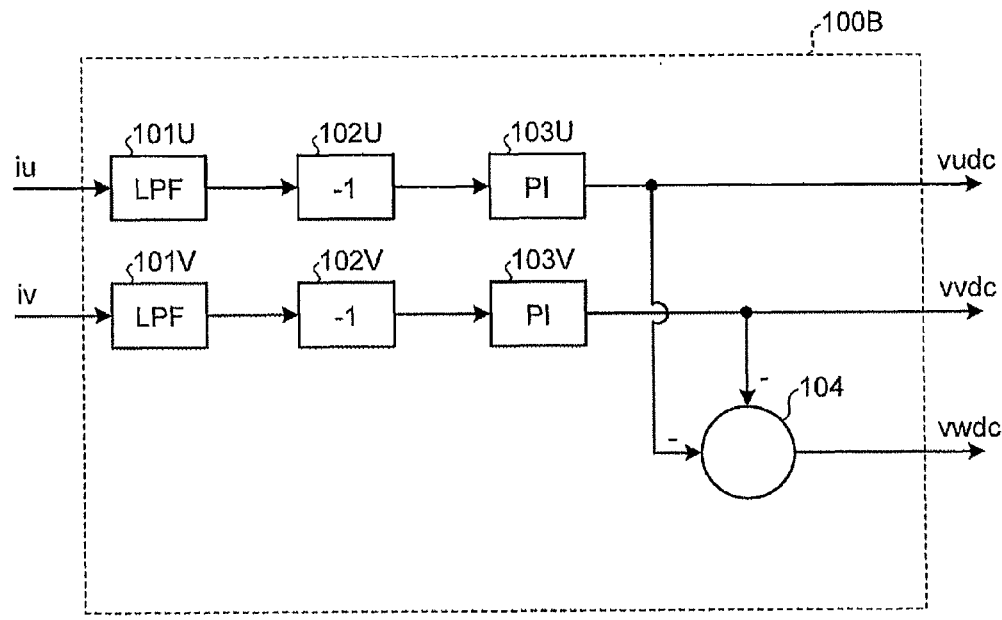
FIG. 5 is a view which illustrates a structural example of the motor current imbalance compensation unit according to a second embodiment of the invention.

FIG. 5 is a view illustrating a structural example of the motor current imbalance compensation unit 100B according to the second embodiment of the invention. Since the second embodiment is based on the first embodiment, only the parts different from the configuration of the first embodiment will be described in the following, while description for the parts having the same configuration as the first embodiment will not be repeated. Compared to the first embodiment, as illustrated in FIG. 5, the currents iu, iv of two phases among the three-phase currents iu, iv, iw detected respectively by the current detectors 3, 4, 5 are inputted to the motor current imbalance compensation unit 100B. Then, the unnecessary frequency components are eliminated respectively by the LPFs 101U, 101V. Further, after the polarity is inverted respectively by the gains 102U, 102V, inputting to the proportional integral elements 103U, 103V is performed. The outputs of the proportional integral elements 103U, 103V are outputted as the motor current imbalance compensation amounts vudc, vvdc of the respective phases. The motor current imbalance compensation amount vwdc of the remaining W-phase is calculated and outputted by utilizing a subtractor 104 with the equation of vwdc=−vudc−vvdc.

In FIG. 5, the currents iu, iv of the two phases are inputted among the three-phase currents iu, iv, iw detected respectively by the current detectors 3, 4, 5. However, it is also possible to input other two phases (for example, iv and iw). In this case, the motor current imbalance amounts vvdc, vwdc of the V-phase and the W-phase are calculated from the currents iv, iw of the two phases, respectively, via the LPF 101, the gain 102 and the proportional integral element 103. The motor current imbalance compensation amount vudc of the remaining U-phase is calculated and outputted with the equation of vudc=−vvdc−vwdc. That is, the motor current imbalance compensation amount other than the inputted two-phases is obtained on the basis that the sum of the motor current imbalance compensation amounts of the three phases (i.e., vudc+vvdc+vwdc) becomes zero.

With the above-mentioned configuration, it becomes possible to compensate the imbalance of the motor current caused by an error from a true value contained in the output of the resolver 7 being the position detector, by an error contained in the inverter output voltage command, by unevenness of on-voltage-drop among switching elements forming the inverter 2, by correlation variation of the impedance of the motor and the like. Accordingly, it becomes possible to provide the control apparatus of an alternating-current motor capable of preventing torque pulsation and damage of the motor.

Third Embodiment

Figure 6:
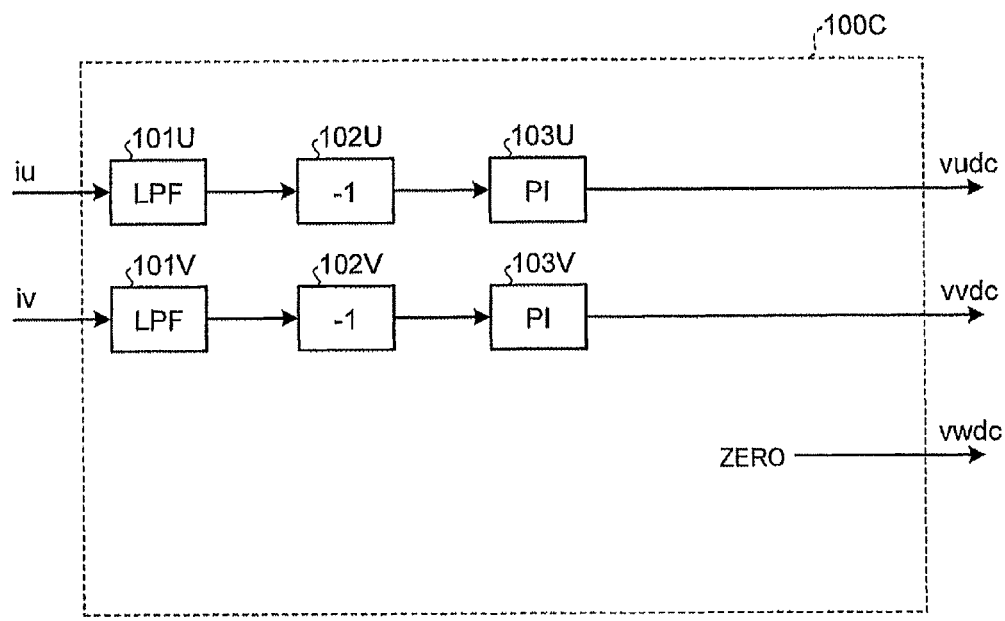
FIG. 6 is a view which illustrates a structural example of the motor current imbalance compensation unit according to a third embodiment of the invention.

Next, the configuration of a third embodiment of the invention will be described. Since the third embodiment is based on the first embodiment, only the parts different from the configuration of the first embodiment will be described in the following, while description for the parts having the same configuration as the first embodiment will not be repeated. FIG. 6 is a view illustrating a structural example of the motor current imbalance compensation unit 100C according to the third embodiment of the invention. Compared to the first embodiment, as illustrated in FIG. 6, the currents iu, iv of two phases among the three-phase currents iu, iv, iw detected respectively by the current detectors 3, 4, 5, which are inputted to the motor current imbalance compensation unit 100C. Then, the unnecessary components are eliminated, respectively, by the LPFs 101U, 101V. Further, after the polarity is inverted respectively by the gains 102U, 102V, inputting to the proportional integral elements 103U, 103V is performed. The outputs of the proportional integral elements 103U, 103V are outputted as the motor current imbalance compensation amounts vudc, vvdc of the respective phases. The motor current imbalance compensation amount vwdc of the remaining W-phase is fixed and outputted as being zero.

In FIG. 6, the currents iu, iv of two phases are inputted among the three-phase currents iu, iv, iw detected by the current detectors 3, 4, 5, respectively. However, it is also possible to input other two phases (for example, iv and iw).

That is, it is preferable to fix the motor current imbalance compensation amount of an arbitrary one phase as being zero and to obtain only the motor current imbalance compensation amounts of the remaining two phases from the detected currents of the two phases. For example, as described above, the motor current imbalance compensation amount vudc of the U-phase may be outputted as being zero while the motor current imbalance amounts vvdc, vwdc of the V-phase and the W-phase are outputted via the LPF 101, the gain 102 and the proportional integral element 103.

With the above-mentioned configuration, it becomes possible to compensate the imbalance of the motor current caused by an error from a true value contained in the output of the resolver 7 being the position detector, by an error contained in the inverter output voltage command, by unevenness of on-voltage-drop among switching elements forming the inverter 2, by correlation variation of the impedance of the motor and the like. Accordingly, it becomes possible to provide the control apparatus of an alternating-current motor capable of preventing torque pulsation and damage of the motor.

Compared to the first embodiment, the configurations of the second embodiment and the third embodiment have the following features. In the configuration of the first embodiment, the motor current imbalance compensation amounts vudc, vvdc, vwdc of the three phases are separately obtained from the current detection values iu, iv, iw of the respective phases. However, in the case that an offset component is superimposed to the current detection values iu, iv, iw of the current detectors 3, 4, 5, the following phenomenon may be considered.

Here, when the current detection values are processed not to contain an offset component in the current detection values iu, iv, iw of the current detector 3, 4, 5, the problem described in the following does not occur. However, it is generally difficult to completely eliminate the offset component.

As an example, it is assumed that positive offset is superimposed to all of the detection values of the current detectors 3, 4, 5, namely, that a zero-phase component exists in the current detection values. In this case, all of the motor current imbalance compensation amounts vudc, vvdc, vwdc of the three phases calculated in the procedure of the first embodiment become negative. Accordingly, the negative motor current imbalance compensation amounts vudc, vvdc, vwdc of the three phases are respectively added to the U-phase base voltage command Vu, the V-phase base voltage command Vv and the W-phase base voltage command Vw**. Thus, the U-phase voltage command Vu*, the V-phase voltage command Vv* and the W-phase voltage command Vw* are superimposed respectively with a negative zero-phase component. Here, since no variation occurs at the voltage between the output lines of the inverter 2 even when a zero-phase component is superimposed to the voltage command, no variation occurs at the motor current. Further, since the output of the inverter 2 is formed as a three-phase three-wire type, zero-phase current is not generated actually. Accordingly, the zero-phase component existing in the current detection values iu, iv, iw of the current detectors 3, 4, 5 cannot be compensated to be eliminated and remains. Therefore, the offset components contained in the current detection values iu, iv, iw are continued to be amplified by the integral elements in the proportional integral elements 103. Then all of the motor current imbalance compensation amounts vudc, vvdc, vwdc are increased in negative direction and diverged with time. In such a state, appropriate compensation of the motor current imbalance cannot be performed, and further, there is a possibility that the normal driving of the motor becomes difficult.

The configurations of the second and third embodiments are distinctive in that the motor current imbalance compensation amounts vudc, vvdc, vwdc of the three phases are not obtained from the currents iu, iv, iw of the respective phases. Specifically, the motor current imbalance compensation amount of any one of the phases is determined from the motor current imbalance compensation amounts of the remaining two phases or the amount is fixed to be zero.

With the configurations described in the second and third embodiments, the phenomenon of increasing and the diverging of the motor current imbalance compensation amounts vudc, vvdc, vwdc of the three phases can be avoided even in the case that an offset component is superimposed respectively to the current detection values iu, iv, iw of the current detectors 3, 4, 5. Accordingly, it becomes possible to appropriately compensate imbalance of the motor currents, so that normal driving of the motor becomes possible.

Further, since currents of arbitrary two phases are only needed to be detected among three phases of inverter output, the number of necessary current detectors may be only two. In addition, arithmetic of the motor current imbalance compensation units 100B, 100C is simplified and the control apparatus 200 of an alternating-current motor may be downsized and lightened.

Fourth Embodiment

Figure 7:
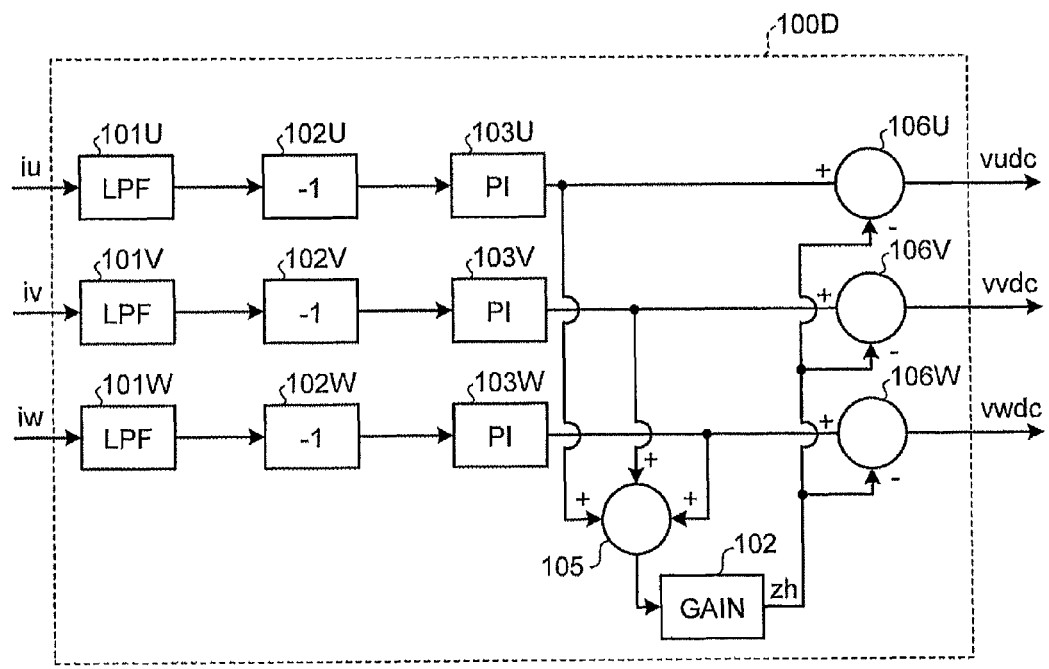
FIG. 7 is a view which illustrates a structural example of the motor current imbalance compensation unit according to a fourth embodiment of the invention.

Next, the configuration of the fourth embodiment of the invention will be described. Since the fourth embodiment is based on the first embodiment, only the parts different from the configuration of the first embodiment will be described in the following, while description for the parts having the same configuration as the first embodiment will not be repeated. FIG. 7 is a view illustrating a structural example of the motor current imbalance compensation unit 100D according to the fourth embodiment of the invention. As illustrated in FIG. 7, the three-phase currents iu, iv, iw detected respectively by the current detectors 3, 4, 5 are inputted to the motor current imbalance compensation unit 100D. The unnecessary components are eliminated from the three-phase currents iu, iv, iw respectively by the LPFs 101U to 101W. Then, after the polarity is inverted respectively by the gains 102U to 102W, inputting to the proportional integral elements 103U to 103W is performed. The sum of the outputs of the proportional integral elements 103U to 103W is obtained via the adder 105. A zero-phase component correction amount zh is the value obtained by multiplying the sum by the gain at the gain 102. The values obtained by subtracting the zero-phase component correction value zh is subtracted respectively from the outputs of the proportional integral elements 103U to 103W at the subtractors 106U to 106W. The values obtained thus are determined to be the motor current imbalance compensation amounts of the three phases vudc, vvdc, vwdc. Here, the value of the gain 102 is preferably to be ⅓.

With the above-mentioned configuration, it becomes possible to compensate the imbalance of the motor current caused by an error from a true value contained in the output of the resolver 7 being the position detector, by an error contained in the inverter output voltage command, by unevenness of on-voltage-drop among switching elements forming the inverter 2, by correlation variation of the impedance of the motor 6 and the like. Accordingly, it becomes possible to provide the control apparatus 200 of an alternating-current motor capable of preventing torque pulsation and damage of the motor 6.

Further, the phenomenon of increasing in the positive or negative direction and diverging of the motor current imbalance compensation amounts vudc, vvdc, vwdc of the three phases can be avoided even in the case that the above-mentioned offset component is superimposed respectively to the current detection values iu, iv, iw of the current detectors 3, 4, 5. Accordingly, it becomes possible to appropriately compensate imbalance of the motor currents, so that normal driving of the motor 6 becomes possible.

Here, the configuration of the fourth embodiment is slightly more complicated than those of the second and third embodiments. However, the fourth embodiment is distinctive in that the imbalance compensation performance of the motor current (i.e., the current imbalance suppressing effect and the torque ripple suppressing effect) is superior to that of the configurations of the second and third embodiments.

Next, points to note being common to the first to fourth embodiments will be described.

(Note 1)

There is a fear that current vibration of the motor 6 occurs due to interference between the motor current imbalance compensation amounts vudc, vvdc, vwdc, which are from the motor current imbalance compensation units 100A to 100D, and the outputs of the current control device containing the d-axis current control unit 20 and q-axis current control unit 23. Accordingly, it is preferable to maintain an interval between a response of the motor current imbalance compensation system and a response of the current control system so as not to be matched. Here, the response of the motor current imbalance compensation system denotes the response from the input of the motor current imbalance compensation units 100A to 100D until the motor currents Iu, Iv, Iw. The response of the current control system denotes the response from the input of the d-axis current control unit 20 and the q-axis current control unit 23 until the motor currents Iu, Iv, Iw. In general, it is preferable to arrange the response of the motor current imbalance compensation system to be slower than the response of the current control system. Further, for arranging in a simple manner, the motor current imbalance compensation may be performed while the output of the current control system containing the d-axis current control unit 20 and the q-axis current control unit 23 is set to be zero as stopping the calculation thereof or the output is to be a constant fixed value. That is, the motor current imbalance compensation amount is arranged so as to adjust, in association with the state of the current control system, the operational degree including whether or not the compensation is performed.

(Note 2)

The LPFs 101U to 101W are simply for extracting low-frequency components including direct-current among the components contained in the motor currents iu, iv, iw. It is preferable to set the cutoff frequency to several Hz or lower. Here, it is preferable that the cutoff frequency of the LPFs 101U to 101W is determined in association with the output frequency of the inverter FINV for performing the motor current imbalance compensation. That is, a band of the output frequency of the inverter FINV for performing the motor current imbalance compensation is set to be higher than the cutoff frequency of the LPFs 101U to 101W. For example, when the cutoff frequency of the LPFs 101U to 101W is set to 2 kHz, it is preferable to perform the motor current imbalance compensation in the range where the output frequency of the inverter FINV is 10 kHz or higher. In this condition, excessive base wave component of the motor current contained in the motor current imbalance compensation amount and excessive motor current imbalance compensation amount can be prevented.

(Note 3)

It is preferable that the timing of starting or stopping to perform the motor current imbalance compensation is related to the output frequency of the inverter FINV, the modulation factor PMF or the pulse mode. The reason will be described in the following. In the area of the synchronous mode or the one-pulse mode, the number of pulses included in a half cycle of the output voltage of the inverter 2 becomes small. Accordingly, as described above, it is needed to decrease the response of the current control system, which is formed of the d-axis current control unit 20 and the q-axis current control unit 23, or to switch to stop the control of the current control system or to adjust only the voltage phase applied to the motor. In this case, the three-phase imbalance suppressing effect of the motor current by the current control system is decreased or invalidated. Thus, it is also possible that the motor current imbalance compensation of the invention is performed only at the area of the synchronous mode or the one-pulse mode. Accordingly, the timing of starting or stopping to perform the motor current imbalance compensation may be determined based on the pulse mode of the inverter 2. Incidentally, instead of being based on the pulse mode, the similar effect can be obtained by determining based on amounts related to the switching timing of the pulse mode, which are the modulation factor PMF, the output frequency of the inverter FINV, speed of an electric vehicle or the like.

(Note 4)

In the applied example of the invention, as described above, the motor 6 is driven while performing the switching among a plurality of pulse modes in accordance with the drive state of the motor 6. In this case, the pulse width and the pulse position forming the voltage between the output lines of the inverter 2 are varied in accordance with the pulse mode. Thus, the imbalance amount of the motor current is to be varied in accordance with the pulse mode. After the imbalance of the motor current is generated, the motor current imbalance compensation units 100A to 100D generate the motor current imbalance compensation amounts vudc, vvdc, vwdc in a feedback manner and perform the compensation operation so as to suppress the imbalance of the motor current, by using the above-mentioned LPF 101, the gains 102U to 102W, the proportional integral elements 103U to 103W based on the current detected by the current detectors 3, 4, 5.

However, at the instance following the switching of the pulse mode, the outputs of the proportional integral elements 103U to 103W (i.e., the motor current imbalance compensation amounts) are not optimum compensation values in the pulse mode after the switching. Accordingly, it takes transient time until the motor current imbalance compensation amounts vudc, vvdc, vwdc are statically determined. That is, imbalance of the motor current occurs until the motor current imbalance compensation amounts vudc, vvdc, vwdc are statically determined to be the optimum values. As measures against such a phenomenon, it may be considered to store the imbalance amounts of the motor current in each of the plurality of pulse modes during operation of the motor 6 by the control apparatus 200 of an alternating-current motor and to previously calculate and obtain the motor current imbalance predictive compensation amounts for the compensation. Then, during the next operation of the motor 6, the motor current imbalance predictive compensation amounts which are previously calculated and obtained corresponding to each of the above-mentioned pulse modes are to be added to the outputs of the proportional integral elements 103U to 103W in a feedforward manner. Accordingly, the difference of the motor current imbalance compensation amount between before switching and after switching of the pulse mode is compensated in a feedforward manner, so that only the error amount contained in the motor current imbalance predictive compensation amounts is to be compensated in a feedback manner using the proportional integral elements 103U to 103W. Therefore, occurring of the transient imbalance of the motor current after the switching of the pulse mode can be suppressed to a minimum. Here, in the case that the operation of the switching element of the inverter 2 is stopped, it is preferable that the calculation outputs of the motor current imbalance compensation units 100A to 100D are stopped. Accordingly, it is possible to avoid divergence of the motor current imbalance compensation amounts vudc, vvdc, vwdc caused by offset components contained in the outputs of the current detectors 3, 4, 5.

With the motor current imbalance compensation units 100A to 100D described in the above-mentioned first to fourth embodiments, in the control apparatus of an alternating-current motor operating in the synchronous mode and the one-pulse mode, it becomes possible to suppress the imbalance of the motor current caused by an error from a true value contained in the output of the resolver 7 being the position detector, by an error contained in the inverter output voltage command, by unevenness of on-voltage-drop among switching elements, by correlation variation of the impedance of the motor 6 and the like. Accordingly, it becomes possible to provide the control apparatus 200 of an alternating-current motor capable of preventing torque pulsation and damage of the motor 6.

In the example configuration of the above description, the three-phase voltage command is adjusted in accordance with the motor current imbalance compensation amount. However, not limited to this configuration, other methods can be adopted provided that the gate signals U, V, W, X, Y, Z being pulse width modulation signals can be directly or indirectly adjusted in accordance with the motor current imbalance compensation amount. For example, it is also possible to adopt a method to directly correct the switching timing in accordance with the motor current imbalance compensation amount.

In the description of the above-mentioned embodiments, the control apparatus of an alternating-current motor is for controlling a permanent magnet synchronous motor. However, the concept of the invention may be applied to a control apparatus of an alternating-current motor to control driving of other types of motors.

The configurations described in the above-mentioned embodiments are examples of the invention. It is also possible to combine with separate known technology. Further, it is needless to say that a part thereof may be abbreviated or modified within the scope of the invention.

Further, in this specification, the invention is described in consideration to being applied to a control apparatus of an alternating-current motor for an electric vehicle. However, not limited to this application, it is needless to say that the invention can be applied to various fields such as electric automobiles and elevators.

INDUSTRIAL APPLICABILITY

The invention is useful for a control apparatus of an alternating-current motor for an electric vehicle driving, in particular, is useful for a control apparatus suitable for control of a permanent magnet synchronous motor.

The invention claimed is:

1. A control apparatus of an alternating-current motor, comprising:
    an inverter which is connected to a direct-current source and outputs three-phase alternating currents of arbitrary frequency and arbitrary voltage to the alternating-current motor;
    a current detector which detects a current of the alternating-current motor;
    a voltage command/PWM signal generation unit which calculates an output voltage command of the inverter based on a signal from the current detector, and generates a pulse width modulation signal to control a switching element, which is arranged in the inverter, based on the output voltage command; and
    a motor current imbalance compensation unit which generates motor current imbalance compensation amounts of the corresponding phases based on the currents of at least any two of the phases among the currents detected by the current detector and sets a motor current imbalance compensation amount of the remaining one phase to be zero, wherein the voltage command/PWM signal generation unit directly or indirectly adjusts the pulse width modulation signal of the two phases based on the current imbalance compensation amounts.

2. The control apparatus of an alternating-current motor according to claim 1, wherein the voltage command/PWM signal generation unit adjusts the output voltage commands based on the current imbalance compensation amounts.

3. The control apparatus of an alternating-current motor according to claim 1, wherein a degree of the adjusting, or whether the direct or indirect adjusting of the pulse width modulation signals is performed based on the current imbalance compensation amount, is determined in association with any of a pulse mode state of the inverter, an output frequency of the inverter, and a modulation factor.

4. The control apparatus of an alternating-current motor according to claim 1, wherein the current imbalance compensation amounts are calculated based on a value of a low-frequency component of several Hz or lower including direct-current, which is extracted from a current detection value of the current detector.

5. The control apparatus of an alternating-current motor according to claim 1, wherein in a case that a low-pass filter is further included as a unit to extract a low-frequency component of several Hz or lower including direct-current from a current detection value of the current detector, a band of an output frequency of the inverter, the pulse width modulation signal of which is directly or indirectly adjusted in accordance with the current imbalance compensation amounts, is set to be higher than a cutoff frequency of the low-pass filter.

6. The control apparatus of an alternating-current motor according to claim 1, wherein calculation outputting of the current imbalance compensation unit is stopped when operation of the switching element is stopped.

7. A control apparatus of an alternating-current motor, comprising:

an inverter which is connected to a direct-current source and outputs three-phase alternating currents of arbitrary frequency and arbitrary voltage to the alternating-current motor;

a current detector which detects a current of the alternating-current motor;

a voltage command/PWM signal generation unit which calculates an output voltage command of the inverter based on a signal from the current detector, and generates a pulse width modulation signal to control a switching element, which is arranged in the inverter, based on the output voltage command; and a motor current imbalance compensation unit configured to generate base amounts of the motor current imbalance compensation amounts of the corresponding phases based on the currents detected by the current detector, and to generate the motor current imbalance compensation amounts of the corresponding phases obtained by subtracting an amount, which is based on a sum of the base amounts of the motor current imbalance compensation amounts, respectively from the base amounts of the current imbalance compensation amounts of the three phases, wherein the voltage command/PWM signal generation unit directly or indirectly adjusts the pulse width modulation signals of the three phases based on the current imbalance compensation amounts.

8. The control apparatus of an alternating-current motor according to claim 7, wherein the voltage command/PWM signal generation unit adjusts the output voltage commands based on the current imbalance compensation amounts.

9. The control apparatus of an alternating-current motor according to claim 7, wherein a degree of the adjusting, or whether the direct or indirect adjusting of the pulse width modulation signals is performed based on the current imbalance compensation amount, is determined in association with any of a pulse mode state of the inverter, an output frequency of the inverter, and a modulation factor.

10. The control apparatus of an alternating-current motor according to claim 7, wherein the current imbalance compensation amounts are calculated based on a value of a low-frequency component of several Hz or lower including direct-current, which is extracted from a current detection value of the current detector.

11. The control apparatus of an alternating-current motor according to claim 7, wherein in a case that a low-pass filter is further included as a unit to extract a low-frequency component of several Hz or lower including direct-current from a current detection value of the current detector, a band of an output frequency of the inverter, the pulse width modulation signal of which is directly or indirectly adjusted in accordance with the current imbalance compensation amounts, is set to be higher than a cutoff frequency of the low-pass filter.

12. The control apparatus of an alternating-current motor according to claim 7, wherein calculation outputting of the current imbalance compensation unit is stopped when operation of the switching element is stopped.

13. A control apparatus of an alternating-current motor, comprising:

an inverter which is connected to a direct-current source and outputs three-phase alternating currents of arbitrary frequency and arbitrary voltage to the alternating-current motor;

a current detector which detects a current of the alternating-current motor;

a voltage command/PWM signal generation unit which calculates an output voltage command of the inverter based on a signal from the current detector, and generates a pulse width modulation signal to control a switching element, which is arranged in the inverter, based on the output voltage command; and a motor current imbalance compensation unit which generates a motor current imbalance compensation amount based on the current detected by the current detector, wherein the current imbalance compensation amount is configured to be outputted in a case that an operating pulse mode of the inverter is a synchronous pulse mode or a one-pulse mode, and the voltage command/PWM signal generation unit directly or indirectly adjusts the pulse width modulation signal based on the current imbalance compensation amount.

14. A control apparatus of an alternating-current motor, comprising:
an inverter which is connected to a direct-current source and outputs three-phase alternating currents of arbitrary frequency and arbitrary voltage to the alternating-current motor;
a current detector which detects a current of the alternating-current motor;
a voltage command/PWM signal generation unit which calculates an output voltage command of the inverter based on a signal from the current detector, and generates a pulse width modulation signal to control a switching element, which is arranged in the inverter, based on the output voltage command; and
a motor current imbalance compensation unit which generates a motor current imbalance compensation amount based on the current detected by the current detector, wherein
in a case that a current control system that adjusts largeness of a voltage applied to the alternating-current motor is further included in order to divide the current detected by the current detector into a d-axis current and a q-axis current on a two orthogonal axes coordinates that have a d-axis and a q-axis and rotate in synchronization with a frequency of output voltage of the inverter and to match the d-axis current and the q-axis current to respective command values,
the current imbalance compensation amount is outputted to the voltage command/PWM signal generation unit in a case of decreasing a response of the current control system, in a case of switching to stop the control of the current control system, or in a case of adjusting only a voltage phase applied to the motor, and
the voltage command/PWM signal generation unit directly or indirectly adjusts the pulse width modulation signal based on the current imbalance compensation amount.

15. A control apparatus of an alternating-current motor, comprising:
an inverter which is connected to a direct-current source and outputs three-phase alternating currents of arbitrary frequency and arbitrary voltage to the alternating-current motor;
a current detector which detects a current of the alternating-current motor;
a voltage command/PWM signal generation unit which calculates an output voltage command of the inverter based on a signal from the current detector, and generates a pulse width modulation signal to control a switching element, which is arranged in the inverter, based on the output voltage command;
a motor current imbalance compensation unit which generates a motor current imbalance compensation amount based on the current detected by the current detector; and
a current control system that adjusts largeness of a voltage applied to the alternating-current motor in order to divide the current detected by the current detector into a d-axis current and a q-axis current on a two orthogonal axes coordinates that have a d-axis and a q-axis and rotate in synchronization with a frequency of output voltage of the inverter and to match the d-axis current and the q-axis current to respective command values, wherein a response of a motor current imbalance compensation system, in which the motor current imbalance compensation unit is included, and a response of the current control system of the inverter are set not to be matched mutually, and
the voltage command/PWM signal generation unit directly or indirectly adjusts the pulse width modulation signal based on the current imbalance compensation amount.

16. A control apparatus of an alternating-current motor, comprising:
an inverter which is connected to a direct-current source and outputs three-phase alternating currents of arbitrary frequency and arbitrary voltage to the alternating-current motor;
a current detector which detects a current of the alternating-current motor;
a voltage command/PWM signal generation unit which calculates an output voltage command of the inverter based on a signal from the current detector, and generates a pulse width modulation signal to control a switching element, which is arranged in the inverter, based on the output voltage command;
a motor current imbalance compensation unit which generates a motor current imbalance compensation amount based on the current detected by the current detector; and
a current control system that adjusts largeness of a voltage applied to the alternating-current motor in order to divide the current detected by the current detector into a d-axis current and a q-axis current on a two orthogonal axes coordinates that have a d-axis and a q-axis and rotate in synchronization with a frequency of output voltage of the inverter and to match the d-axis current and the q-axis current to respective command values, wherein
a response of a motor current imbalance compensation system, in which the motor current imbalance compensation unit is included, is set to be slower than a response of the current control system of the inverter, and
the voltage command/PWM signal generation unit directly or indirectly adjusts the pulse width modulation signal based on the current imbalance compensation amount.

17. A control apparatus of an alternating-current motor, comprising:
an inverter which is connected to a direct-current source and outputs three-phase alternating currents of arbitrary frequency and arbitrary voltage to the alternating-current motor;
a current detector which detects a current of the alternating-current motor;
a voltage command/PWM signal generation unit which calculates an output voltage command of the inverter based on a signal from the current detector, and generates a pulse width modulation signal to control a switching element, which is arranged in the inverter, based on the output voltage command; and
a motor current imbalance compensation unit which generates a motor current imbalance compensation amount based on the current detected by the current detector, wherein
a compensation amount against an imbalanced component included in the current of the alternating-current motor is determined to be a motor current imbalance predictive compensation amount, and the motor current imbalance compensation unit outputs the current imbalance compensation amount containing the current imbalance predictive compensation amount, and the voltage command/PWM signal generation unit directly or indirectly adjusts the pulse width modulation signal based on the current imbalance compensation amount.

18. The control apparatus of an alternating-current motor according to claim 17, wherein the current imbalance compensation amounts are calculated respectively in accordance with a plurality of pulse modes.

* * * * *